(12) United States Patent
Achilles et al.

(10) Patent No.: US 9,711,964 B2
(45) Date of Patent: Jul. 18, 2017

(54) METHOD AND SYSTEM FOR OPERATING A POWER GENERATION AND DELIVERY SYSTEM

(75) Inventors: Alfredo Sebastian Achilles, Buenos Aires (AR); Einar Vaughn Larsen, Charlton, NY (US)

(73) Assignee: General Electric Corporation, Schenectady, NY (US)

( * ) Notice: Subject to any disclaimer, the term of this patent is extended or adjusted under 35 U.S.C. 154(b) by 771 days.

(21) Appl. No.: 13/245,343

(22) Filed: Sep. 26, 2011

(65) Prior Publication Data

US 2013/0079945 A1 Mar. 28, 2013

(51) Int. Cl.
H02J 3/16 (2006.01)
G06F 1/28 (2006.01)
H02J 3/18 (2006.01)
H02J 3/38 (2006.01)

(52) U.S. Cl.
CPC ............ *H02J 3/1892* (2013.01); *H02J 3/386* (2013.01); *Y02E 10/763* (2013.01)

(58) Field of Classification Search
CPC ...... F03D 7/0224; F03D 9/003; F03D 7/0284; F03D 7/028; F03D 7/047; F03D 7/048; F03D 7/0272; F03D 9/002
USPC .......................................................... 700/298
See application file for complete search history.

(56) References Cited

U.S. PATENT DOCUMENTS

| | | | |
|---|---|---|---|
| 4,994,684 A | 2/1991 | Lauw et al. | |
| 7,312,537 B1 | 12/2007 | Walling | |
| 7,397,143 B2 | 7/2008 | Walling | |
| 7,629,705 B2 | 12/2009 | Barker et al. | |
| 2010/0135789 A1* | 6/2010 | Zheng et al. | 416/1 |
| 2010/0268393 A1* | 10/2010 | Fischle et al. | 700/287 |
| 2011/0064573 A1* | 3/2011 | Viripullan et al. | 416/1 |
| 2011/0089693 A1* | 4/2011 | Nasiri | 290/44 |

(Continued)

FOREIGN PATENT DOCUMENTS

CN 101924371 A 12/2010
WO 2010125687 A1 11/2010

OTHER PUBLICATIONS

Unofficial English translation of Office Action issued in connection with corresponding CN Application No. 201210359878.5 on Aug. 3, 2015.

(Continued)

*Primary Examiner* — Miranda Huang
*Assistant Examiner* — John Park
(74) *Attorney, Agent, or Firm* — James McGinness, Esq.; Armstrong Teasdale LLP

(57) ABSTRACT

A method for controlling operation of a power generation and delivery system while increasing a power output of the power generation and delivery system is described. The method includes, monitoring an output parameter of the power generation and delivery system and determining a rate of change of the output parameter as a function of time. A reactive current command signal is generated a as a function of the determined rate of change of the output parameter. Operation of a power converter is controlled based at least partially on the reactive current command signal to facilitate maintaining a substantially constant terminal voltage as the power output of the power generation and delivery system is increased.

12 Claims, 10 Drawing Sheets

(56) References Cited

U.S. PATENT DOCUMENTS

| 2011/0109086 | A1* | 5/2011 | Stiesdal | F03D 7/0284 |
| | | | | 290/44 |
| 2011/0137474 | A1 | 6/2011 | Larsen et al. | |
| 2011/0187109 | A1* | 8/2011 | Ichinose et al. | 290/44 |
| 2011/0215578 | A1 | 9/2011 | Ichinose et al. | |
| 2013/0015660 | A1* | 1/2013 | Hesselbæk | H02J 3/16 |
| | | | | 290/44 |

OTHER PUBLICATIONS

Boemer, J.C. et al., "Fault ride-through requirements for onshore wind power plants in Europe: The needs of the power system," Power and Energy Society General Meeting, 2011, Detroit, Session Impacts of LVRT on Wind Machines, IEEE, Jul 24, 2011, pp. 1-8.
European Search Report, dated May 29, 2017, for co-pending EP patent application No. EP 12185702.3 (5 pgs).

\* cited by examiner

METHOD AND SYSTEM FOR OPERATING A POWER GENERATION AND DELIVERY SYSTEM

BACKGROUND OF THE INVENTION

The subject matter described herein relates generally to controlling operation of power generation and delivery systems, and more specifically, to controlling operation of a wind turbine in response to a power grid contingency event.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power. The rated power is an output power at which a wind turbine generator can operate with a level of fatigue to turbine components that is predetermined to be acceptable. At wind speeds higher than a certain speed, or at a wind turbulence level that exceeds a predetermined magnitude, typically referred to as a "trip limit" or "monitor set point limit," wind turbines may be shut down, or the loads may be reduced by regulating the pitch of the blades or braking the rotor, in order to protect wind turbine components against damage.

Variable speed operation of the wind turbine generator facilitates enhanced capture of energy by the wind turbine generator when compared to a constant speed operation of the wind turbine generator. However, variable speed operation of the wind turbine generator produces electricity having varying voltage and/or frequency. More specifically, the frequency of the electricity generated by the variable speed wind turbine generator is proportional to the speed of rotation of the rotor. A power converter may be coupled between the electric generator and a utility grid. The power converter outputs electricity having a fixed voltage and frequency for delivery on the utility grid.

A balance between a torque on the rotor created by interaction of the rotor blades and the wind and a generator torque facilitates stable operation of the wind turbine. Wind turbine adjustments, for example, blade pitch adjustments, or grid events, for example, low voltages or zero voltages on the grid, may cause an imbalance between the torque on the rotor caused by the wind and the generator torque. The electric generator has an air gap torque between the generator rotor and stator that opposes the torque applied by the rotor. The power converter also controls the air gap torque which facilitates controlling the power output of the electric generator. However, the wind turbine may not be able to operate through certain grid events, or may sustain wear and/or damage due to certain grid events, due to a time period required for adjustments to wind turbine operation to take effect after detecting the grid event.

BRIEF DESCRIPTION OF THE INVENTION

In one aspect, a method for controlling operation of a power generation and delivery system while increasing a power output of the power generation and delivery system is described. The power generation and delivery system includes an electrical generator, a power converter, and a controller. The method includes monitoring an output parameter of the power generation and delivery system and determining a rate of change of the output parameter as a function of time. The method includes generating a reactive current command signal as a function of the determined rate of change of the output parameter and controlling operation of the power converter based at least partially on the reactive current command signal to facilitate maintaining a substantially constant terminal voltage as the power output of the power generation and delivery system is increased.

In another aspect a control system includes a reactive booster, and a voltage regulator coupled to the reactive booster. The reactive booster is configured to receive an output power signal from a power conversion assembly and generate a supplementary voltage signal as a function of a rate of change of the output power signal. The voltage regulator is configured to receive the supplementary voltage signal, generate a reactive current command signal based at least partially on the supplementary voltage signal, and transmit the reactive current command signal to a controller.

In yet another aspect, a power generation and distribution system is provided. The power generation and distribution system includes an electric generator and a power conversion assembly coupled to the electric generator and a utility grid. The power conversion assembly is configured to receive power generated by the electric generator and convert the power received to a power suitable for transmission over the utility grid. The system includes a control system communicatively coupled to the power conversion assembly. The control system is configured to provide a reactive current control signal to the power conversion assembly. The reactive current control signal is based at least partially on a rate of change of an output parameter of the power conversion assembly as a function of time.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) monitoring an output parameter of a power generation and delivery system; (b) determining a rate of change of the output parameter as a function of time; (c) generating a supplementary voltage command as a function of the determined rate of change of the output parameter; and (d) controlling operation of a power converter based at least partially on the supplementary voltage command.

The methods, systems, and computer readable media described herein facilitate identification of a grid contingency event, a rapid reactive power response to the grid contingency event, and/or voltage stability during recovery from the grid contingency event. The rapid response reduces or substantially eliminates the risk of voltage collapse, and facilitates stabilizing the power generation system and utility grid. Although generally described herein with respect to a wind turbine and/or a solar power generation system, the methods and systems described herein are applicable to any type of electric generation system including, for example, fuel cells, geothermal generators, hydropower generators, and/or other devices that generate power from renewable and/or non-renewable energy sources.

Figure 1:
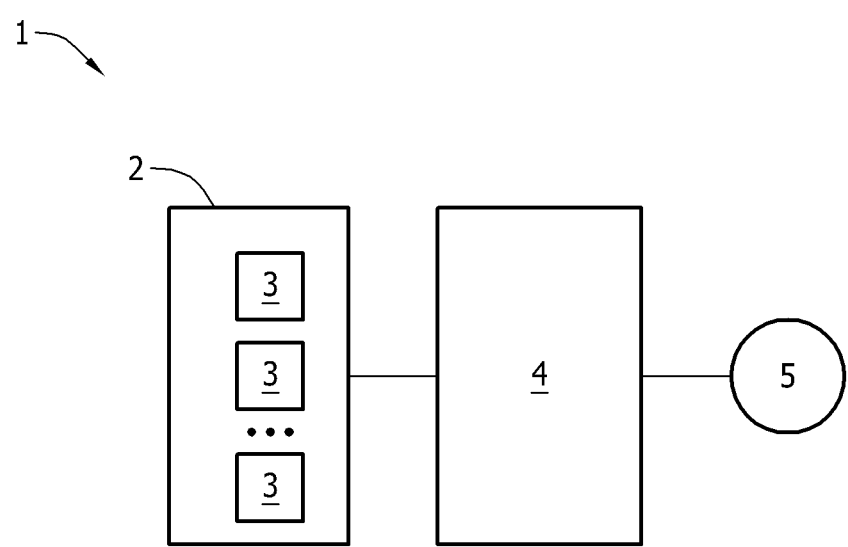
FIG. 1 is a block diagram of an exemplary power generation system.

FIG. 1 is a block diagram of an exemplary power generation system 1 that includes a power generator 2. Power generator 2 includes one or more power generation units 3. Power generation units 3 may include, for example, wind turbines, solar cells, fuel cells, geothermal generators, hydropower generators, and/or other devices that generate power from renewable and/or non-renewable energy sources. Although three power generation units 3 are shown in the exemplary embodiment, in other embodiments, power generator 2 may include any suitable number of power generation units 3, including only one power generation unit 3.

In the exemplary embodiment, power generator 2 is coupled to a power converter 4, or a power converter system 4, that converts a substantially direct current (DC) power output from power generator 2 to alternating current (AC) power. The AC power is transmitted to an electrical distribution network 5, or "grid." Power converter 4, in the exemplary embodiment, adjusts an amplitude of the voltage and/or current of the converted AC power to an amplitude suitable for electrical distribution network 5, and provides AC power at a frequency and a phase that are substantially equal to the frequency and phase of electrical distribution network 5. Moreover, in the exemplary embodiment, power converter 4 provides three phase AC power to electrical distribution network 5. Alternatively, power converter 4 provides single phase AC power or any other number of phases of AC power to electrical distribution network 18. Furthermore, in some embodiments, power generation system 1 may include more than one power converters 4. For example, in some embodiments, each power generation unit may be coupled to a separate power converter 4.

In an exemplary embodiment, power generation units 3 include solar panels coupled to form one or more solar array to facilitate operating power generation system 1 at a desired power output. Each power generation unit 3 may be an individual solar panel or an array of solar panels. In one embodiment, power generation system 1 includes a plurality of solar panels and/or solar arrays coupled together in a series-parallel configuration to facilitate generating a desired current and/or voltage output from power generation system 1. Solar panels include, in one embodiment, one or more of a photovoltaic panel, a solar thermal collector, or any other device that converts solar energy to electrical energy. In the exemplary embodiment, each solar panel is a photovoltaic panel that generates a substantially direct current power as a result of solar energy striking solar panels. In the exemplary embodiment, the solar array is coupled to power converter 4, or power converter system 4, that converts the DC power to alternating current power that is transmitted to electrical distribution network 5.

In other embodiments, power generation units 3 include one or more wind turbines coupled to facilitate operating power generation system 1 at a desired power output. Each wind turbine generates substantially direct current power. The wind turbines are coupled to power converter 4, or power converter system 4, that converts the DC power to AC power that is transmitted to an electrical distribution network 5, or "grid." Methods and systems will be further described herein with reference to such a wind turbine based power generation system. However, the methods and systems described herein are applicable to any type of electric generation system including, for example, fuel cells, geothermal generators, hydropower generators, and/or other devices that generate power from renewable and/or non-renewable energy sources.

Figure 2:
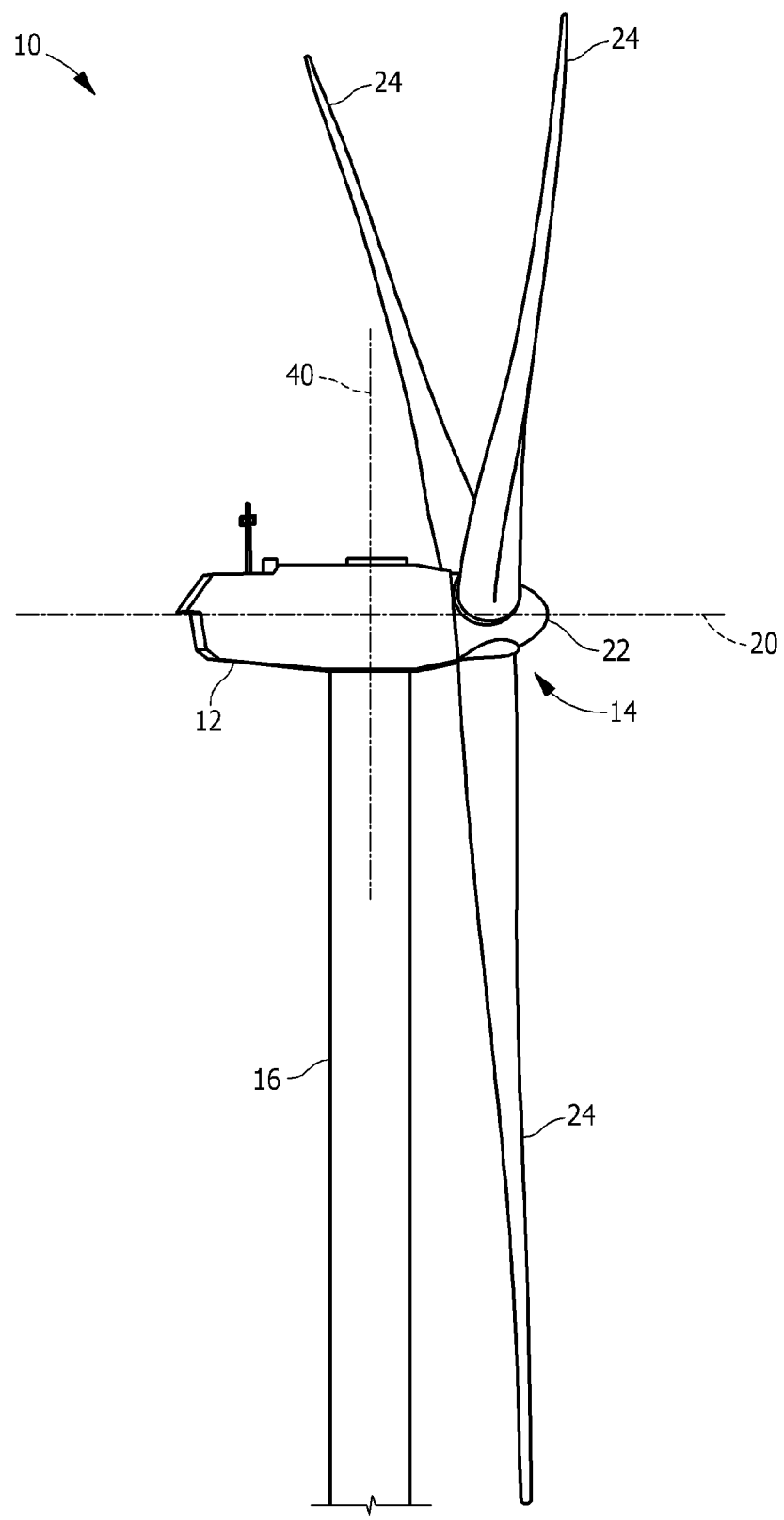
FIG. 2 is a perspective view of a portion of an exemplary wind turbine that may be used in the power generation system shown in FIG. 1.
Figure 3:
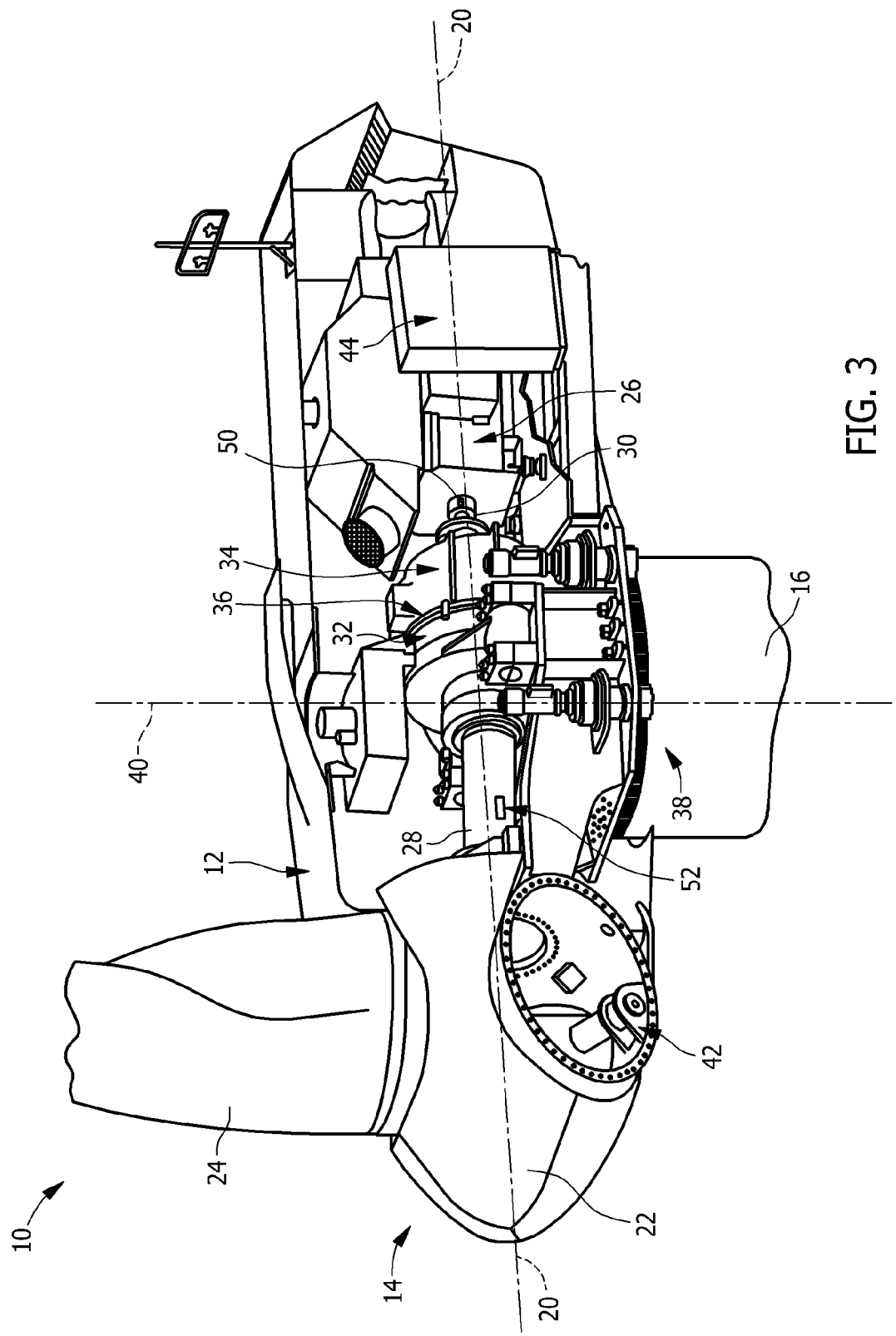
FIG. 3 is a partially cut-away view of a portion of the wind turbine shown in FIG. 2.

FIG. 2 is a perspective view of an exemplary wind turbine 10 that may be used in power generation system 1. FIG. 3 is a partially cut-away perspective view of a portion of wind turbine 10. Wind turbine 10 described and shown herein is a wind turbine generator for generating electrical power from wind energy. Moreover, wind turbine 10 described and illustrated herein includes a horizontal-axis configuration, however, in some embodiments, wind turbine 10 may include, in addition or alternative to the horizontal-axis configuration, a vertical-axis configuration (not shown). Wind turbine 10 may be coupled to an electrical load (not shown in FIG. 2), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIGS. 2 and 3, in some embodiments, a plurality of wind turbines 10 may be grouped together, sometimes referred to as a "wind farm."

Wind turbine 10 includes a body or nacelle 12 and a rotor (generally designated by 14) coupled to nacelle 12 for rotation with respect to nacelle 12 about an axis of rotation 20. In the exemplary embodiment, nacelle 12 is mounted on a tower 16, however, in some embodiments, in addition or alternative to tower-mounted nacelle 12, nacelle 12 may be positioned adjacent the ground and/or a surface of water. The height of tower 16 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24. Blades 24 may each have any length that allows wind turbine 10 to function as described herein. For example, in some embodiments, one or more rotor blades 24 are about one-half meter long, while in some embodiments one or more rotor blades 24 are about fifty meters long. Other examples of blade 24 lengths include ten meters or less, about twenty meters, about thirty-seven meters, and about forty meters. Still other examples include rotor blades between about fifty and about one-hundred meters long, and rotor blades greater than one-hundred meters long.

Despite how rotor blades 24 are illustrated in FIG. 2, rotor 14 may have blades 24 of any shape, and may have blades 24 of any type and/or any configuration, whether such shape, type, and/or configuration is described and/or illustrated herein. One example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Moreover, wind turbine 10 may, in some embodiments, be a wind turbine wherein rotor 14 generally faces upwind to harness wind energy, and/or may be a wind turbine wherein rotor 14 generally faces downwind to harness energy. Of course, in any of the embodiments, rotor 14 may not face exactly upwind and/or downwind, but may face generally at any angle (which may be variable) with respect to a direction of the wind to harness energy therefrom.

Referring now to FIG. 3, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 26 includes a stator (not shown) and a rotor (not shown) with an air gap included therebetween. Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency AC electrical power from rotation of rotor 14. Generator 26 has an air gap torque between the generator rotor and stator that opposes the torque of rotor 14. A power conversion assembly 34 is coupled to generator 26 for converting the variable frequency AC to a fixed frequency AC for delivery to an electrical load (not shown in FIG. 3), such as, but not limited to a power grid (not shown in FIG. 3), coupled to generator 26. Power conversion assembly 34 may include a single frequency converter or a plurality of frequency converters configured to convert electricity generated by generator 26 to electricity suitable for delivery over the power grid. Power conversion assembly 34 may also be referred to herein as a power converter. Power conversion assembly 34 may be located anywhere within or remote to wind turbine 10. For example, power conversion assembly 34 may be located within a base (not shown) of tower 16.

In some embodiments, wind turbine 10 includes a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 includes a yaw system 38 for rotating nacelle 12 about an axis of rotation 40 for changing a yaw of rotor 14, and more specifically for changing a direction faced by rotor 14 to, for example, adjust an angle between the direction faced by rotor 14 and a direction of wind.

In one embodiment, wind turbine 10 includes a variable blade pitch system 42 for controlling, including but not limited to changing, a pitch angle of blades 24 (shown in FIGS. 2-3) with respect to a wind direction. Pitch system 42 may be coupled to system controller 44 for control thereby. Pitch system 42 is coupled to hub 22 and blades 24 for changing the pitch angle of blades 24 by rotating blades 24 with respect to hub 22. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

Figure 4:
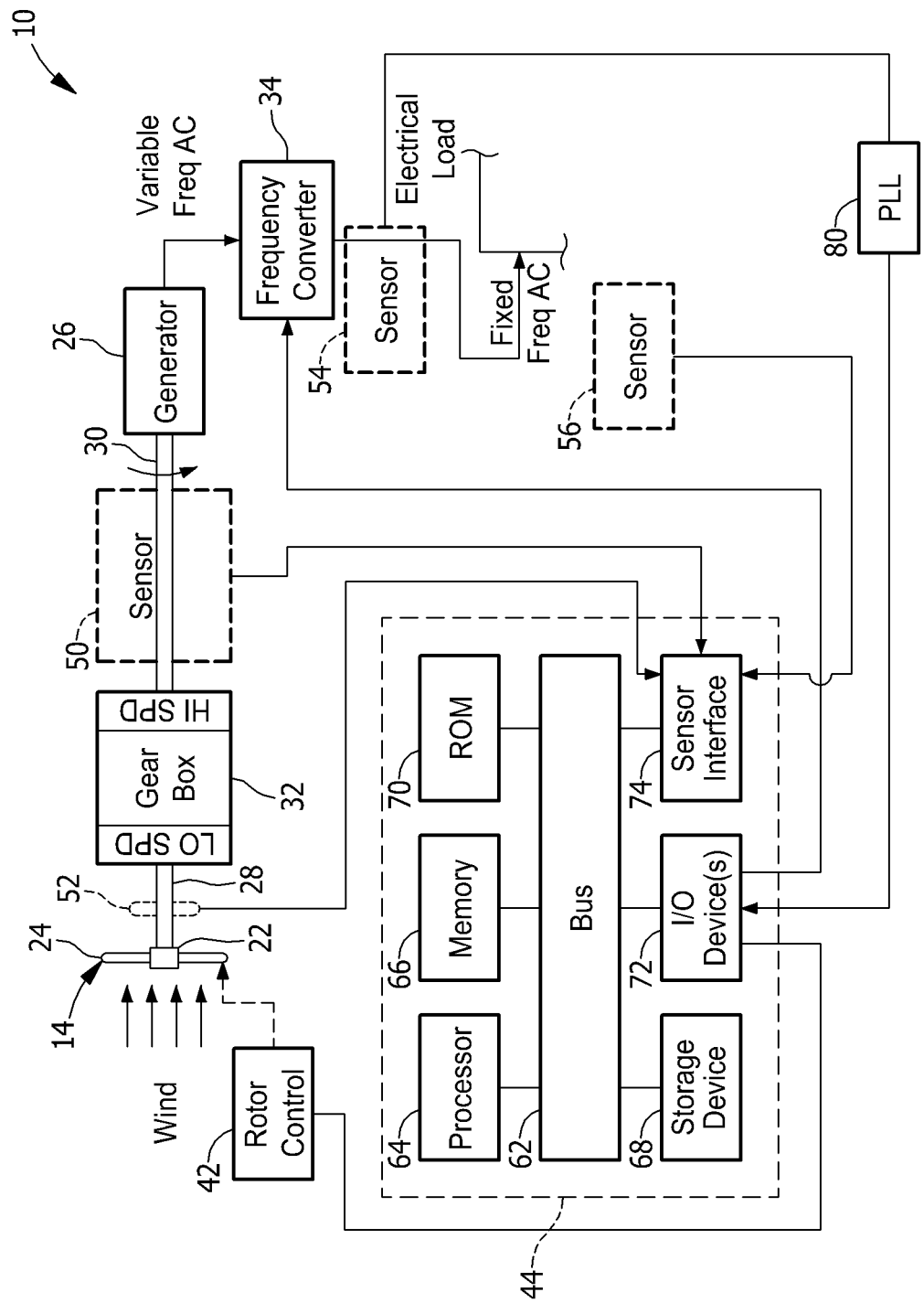
FIG. 4 is a block diagram of the wind turbine shown in FIG. 2.

FIG. 4 is a block diagram of an exemplary embodiment of wind turbine 10. In the exemplary embodiment, wind turbine 10 includes one or more system controllers 44 coupled to at least one component of wind turbine 10 for generally controlling operation of wind turbine 10 and/or controlling operation of the components thereof, regardless of whether such components are described and/or shown herein. For example, in the exemplary embodiment system controller 44 is coupled to pitch system 42 for generally controlling rotor 14. In the exemplary embodiment, system controller 44 is mounted within nacelle 12 (shown in FIG. 3), however, additionally or alternatively, one or more system controllers 44 may be remote from nacelle 12 and/or other components of wind turbine 10. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 50, 54, and 56. Sensors 50, 54, and 56 measure a variety of parameters including, without limitation, operating conditions and atmospheric conditions. Each sensor 50, 54, and 56 may be an individual sensor or may include a plurality of sensors. Sensors 50, 54, and 56 may be any suitable sensor having any suitable location within or remote to wind turbine 10 that allows wind turbine 10 to function as described herein. In some embodiments, sensors 50, 54, and 56 are coupled to system controller 44 for transmitting measurements to system controller 44 for processing thereof.

In some embodiments, system controller 44 includes a bus 62 or other communications device to communicate information. One or more processor(s) 64 are coupled to bus 62 to process information, including information from sensors 50, 54, and 56 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 4). Alternatively, other computer peripherals may also be used that may include, for example, a scanner (not shown in FIG. 4). Furthermore, in the exemplary embodiment, additional output channels may include, for example, an operator interface monitor (not shown in FIG. 4). System controller 44 may also include a sensor interface 74 that allows system controller 44 to communicate with sensors 50, 54, and 56 and/or other sensor(s). Sensor interface 74 may include one or more analog-to-digital converters that convert analog signals into digital signals that can be used by processor(s) 64.

In an exemplary embodiment, wind turbine 10 includes a phase locked loop (PLL) regulator 80. PLL regulator 80 is coupled to sensor 54. In the exemplary embodiment, sensor 54 is a voltage transducer configured to measure a terminal grid voltage output by frequency converter 34. Alternatively, PLL regulator 80 is configured to receive a plurality of voltage measurement signals from a plurality of voltage transducers. In an example of a three-phase generator, each of three voltage transducers is electrically coupled to each one of three phases of a grid bus. PLL regulator 80 may be configured to receive any number of voltage measurement signals from any number of voltage transducers that allow PLL regulator 80 to function as described herein.

Figure 5:
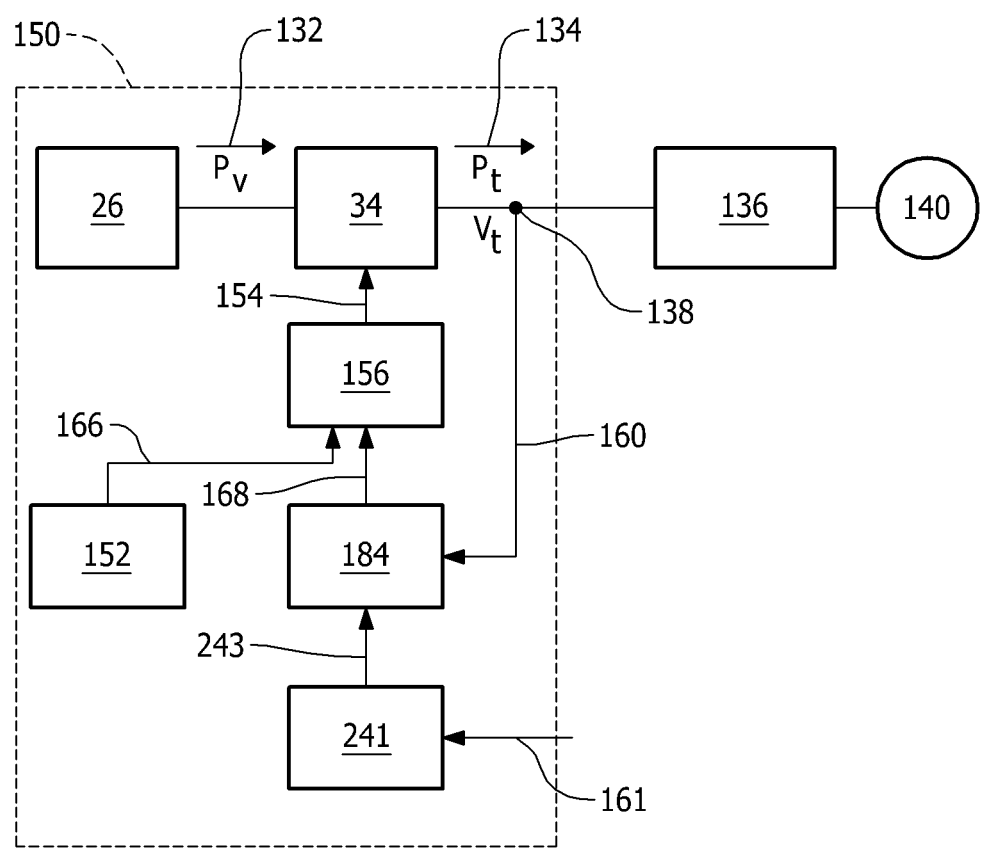
FIG. 5 is a block diagram of an exemplary power generation and delivery system that may include the wind turbine shown in FIG. 2.

FIG. 5 is a block diagram of an exemplary power generation and delivery system 150. Power generation and delivery system 150 may be used with, or included within, wind turbine 10 (shown in FIGS. 2 and 3). System 150 includes an energy source, for example, generator 26. Although described herein as wind turbine generator 26, the energy source may include any type of electrical generator that allows system 150 to function as described herein, e.g. a solar power generation system. System 150 also includes a power converter, such as, power conversion assembly 34. Power conversion assembly 34 receives electrical power ($P_v$) 132 generated by generator 26 and converts electrical power 132 to an electrical power ($P_t$) 134 (referred to herein as terminal power 134) suitable for transmission over an electric power transmission and distribution grid 136 (referred to herein as utility grid 136). A terminal voltage (Vt) 138 is defined at a node between power conversion assembly 34 and utility grid 136. A bulk power system 140 is coupled to utility grid 136. Bulk power system 140 includes a plurality of loads and/or power sources.

In the exemplary embodiment, system 150 includes a grid-dependent power limiter system 152. In the exemplary embodiment, a controller, for example, but not limited to, controller 44 (shown in FIG. 4), is programmed to perform the functions of grid-dependent power limiter system 152. However, in alternative embodiments, the functions of grid-dependent power limiter system 152 may be performed by any circuitry configured to allow system 150 to function as described herein. Power limiter system 152 is configured to identify the occurrence of a grid contingency event, and provide power conversion assembly 34 with signals that facilitate reducing pole-slipping and providing a stable recovery from the grid event. In certain embodiments, power conversion assembly 34 responds according to the signals provided by power limiter system 152 and substantially eliminates pole-slipping. Generally, upon detection of a grid contingency event, power limiter system 152 provides signals to reduce the power output of power conversion assembly 34. During recovery from the grid contingency event, power limiter system 152 provides signals to increase the active power output of power conversion assembly 34. In some embodiments, power limiter system 152 provides a signal, or signals, to increase the active power output of power conversion assembly 34 gradually until the output power of power conversion assembly 34 is returned to its pre-fault level.

System 150 includes a reactive booster system 241 configured to generate a supplemental voltage command signal 243 to increase a reactive current output of power conversion assembly 34 during recovery from a grid contingency event to facilitate maintaining a substantially constant terminal voltage 138 and facilitate prevention of voltage collapse. In the exemplary embodiment, a controller, for example, but not limited to, controller 44 (shown in FIG. 4), is programmed to perform the functions of reactive current booster system 241. However, in alternative embodiments, the functions of reactive current booster system 241 may be performed by any circuitry configured to allow system 150 to function as described herein. In certain embodiments, power conversion assembly 34 responds according to the signals provided by reactive booster system 241 and provides a substantially constant terminal voltage 138 during recovery from the grid event.

A grid event, also referred to herein as a grid contingency event, may leave utility grid 136 in a degraded mode where the grid impedance is too high to accommodate power generated by generator 26. An example of a grid event includes a short-circuit fault on one of the transmission lines within utility grid 136. Electrical transmission protection actions remove the faulted portion of utility grid 136 to permit operation of the remaining unfaulted portion of utility grid 136. A transmission path remains that is degraded in its ability to transmit power from system 150 to bulk power system 140. Such grid events cause a brief period of low voltage on utility grid 136 prior to clearing the faulted portion of the utility grid 136. Typically, terminal voltage 138 will be significantly degraded at the time of the grid event.

Such a grid event may lead to a post-fault condition where the high impedance of utility grid 136 prevents utility grid 136 from transmitting the pre-fault power from wind generator 26 (i.e., the impedance of utility grid 136 is too high to carry the pre-fault power from wind generator 26). In a synchronous machine, this condition may cause a rotor angle of the generator rotor to move past the point where a restraining torque of utility grid 136 is able to balance the mechanical input to wind turbine 10, which is referred to herein as "pole-slipping." In a machine with a power electronic interface (e.g., power conversion assembly 34), this condition may lead to a series of rapid pulsations of power and voltage. Such pulsations are analogous to pole-slipping, although with power conversion assembly 34, control algorithms govern the behavior rather than the physics of synchronous machines. Without precautions in the power converter control algorithms, pole-slipping may occur. The reduction of active current below the pre-fault level during and shortly after the fault can help mitigate pole-slipping. In the post-fault time period, the degraded transmission system 136 may be unable to transfer the pre-fault level of active current before an appropriate amount of reactive current is injected from the generation system 150 into the transmission system 136. Increasing the active current to pre-fault levels without appropriately increasing the reactive current can result in voltage collapse of the transmission system 136.

As shown in FIG. 5, in the exemplary embodiment, power conversion assembly 34 is configured to receive control signals 154 from a converter interface controller 156. Control signals 154 are based on sensed operating conditions or operating characteristics of wind turbine 10 as described herein and used to control the operation of power conversion assembly 34. Examples of measured operating conditions may include, but are not limited to, a terminal grid voltage, a PLL error, a stator bus voltage, a rotor bus voltage, and/or a current. For example, sensor 54 measures terminal grid voltage 138 and transmits a terminal voltage feedback signal 160 to a voltage regulator 184. A sensor, such as sensor 54, measures electrical power 134 and transmits an electrical power feedback signal 161 to reactive booster system 241. Reactive booster system 241 generates supplemental voltage command signal 243 based at least partially on the feedback signal 161 and transmits supplemental voltage command signal 243 to voltage regulator 184. Voltage regulator 184 generates a reactive current command signal 168 based at least partially on supplemental voltage command signal and transmits reactive current command signal 168 to converter interface controller 156. In some embodiments power limiter system 152 also receives terminal voltage feedback signal 160. Based at least partially on terminal voltage feedback signal 160, power limiter system 152 determines when a grid contingency event occurs and/or concludes and generates a real current limiter signal 166 to limit active power output of power conversion assembly 34 during a grid contingency event and gradually increase active power output of power conversion assembly 34 on conclusion of the grid contingency event. Power limiter system 152 transmits real current limiter signal 166 to converter interface controller 156. In an alternative embodiment, converter interface controller 156 is included within system controller 44. Other operating condition feedback from other sensors also may be used by controller 44 and/or converter interface controller 156 to control power conversion assembly 34.

Figure 6:
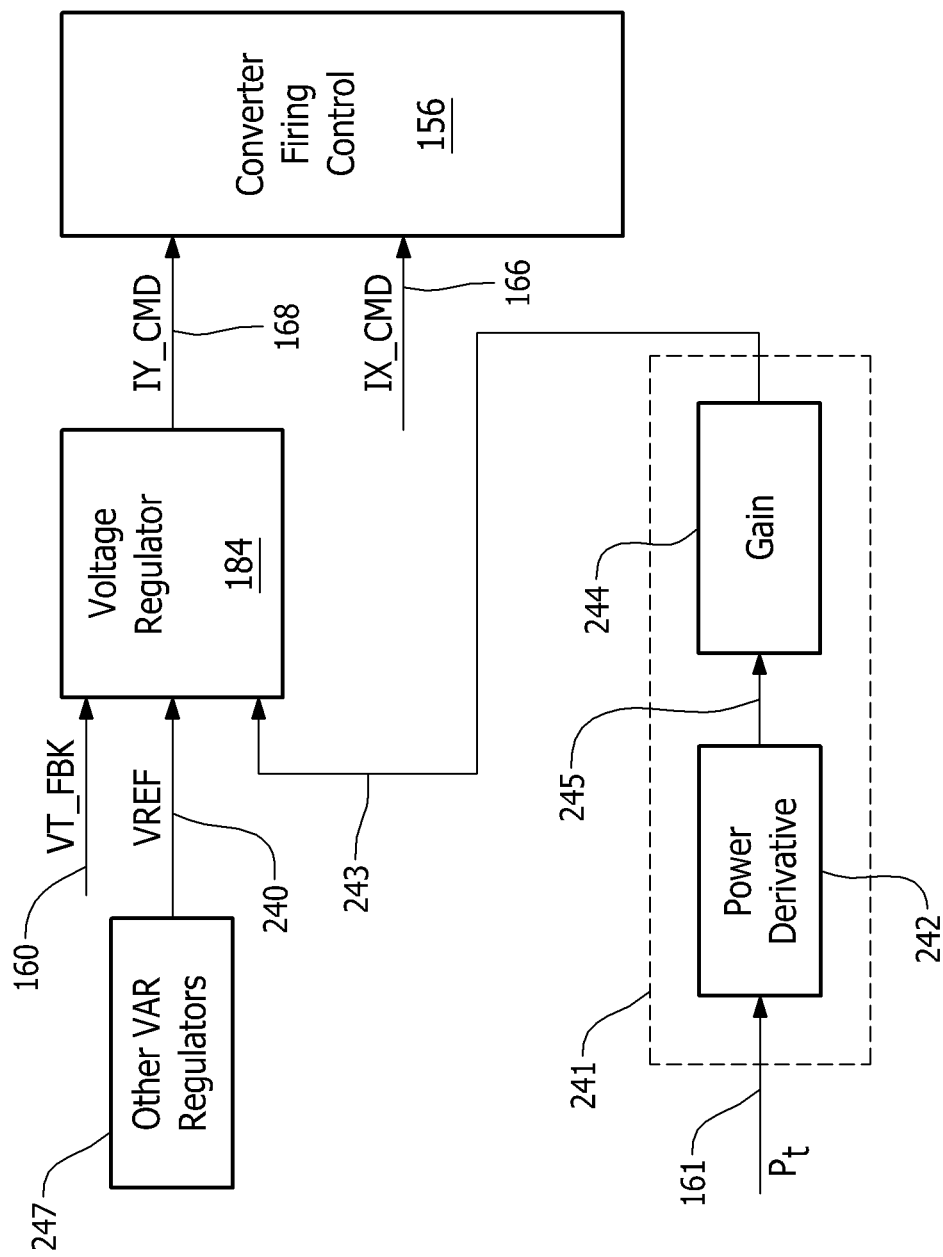
FIG. 6 is a block diagram of an exemplary control system that may be included within the power generation and delivery system shown in FIG. 5.

FIG. 6 is a block diagram of an exemplary control system of power generation and delivery system 150 including an exemplary reactive booster system, for example, reactive booster system 241. In the exemplary embodiment, reactive booster system 241 is configured to output supplementary voltage command signal 243. In other embodiments, reactive booster system 241 may output a supplementary current command, a reactive current command, or any other signal suitable for causing an increase in reactive current output from power conversion assembly 34. In the exemplary embodiment, reactive booster system 241 includes a power derivative estimator 242, and a non-linear gain 244. Derivative estimator 242 receives at least one measured operating condition of system 150. In the exemplary embodiment, the measured operating condition is power output signal 161 from sensor 54. In other embodiments, the measured operating condition includes, but is not limited to, an active current command signal, a power command signal, etc. In the exemplary embodiment, derivative estimator 242 generates, utilizing power derivative estimator 242, a power time-derivative signal 245 and provides power time-derivative signal 245 to non-linear gain 244. Non-linear gain 244 generates supplementary voltage command signal 243 and transmits supplementary voltage command signal 243 to the voltage regulator 184. Voltage regulator 184 generates reactive current command signal 168 and transmits reactive current command signal 168 to converter interface controller 156. Converter interface controller 156 may also be referred to herein as a converter firing control.

Figure 7:
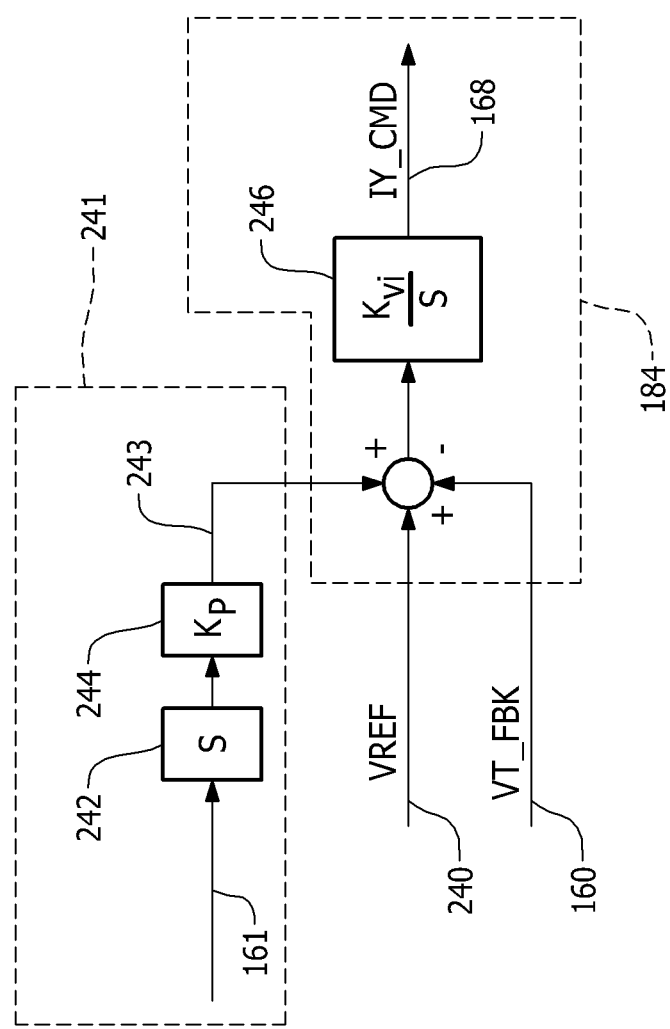
FIG. 7 is a block diagram of an exemplary voltage regulator and reactive booster that may be included within the control system shown in FIG. 6.

FIG. 7 is a block diagram of an exemplary voltage regulator, for example, voltage regulator 184 (shown in FIG. 6) and an exemplary reactive booster system, for example reactive booster system 241 (shown in FIG. 6). As described above with respect to FIG. 6, in the event of a grid contingency such as a weak grid, real current limiter signal 166 instructs converter interface controller 156 to decrease a real component of current that conversion assembly 34 tries to inject onto utility grid 136. Furthermore, to support the terminal voltage 138, upon a drop in terminal voltage 138 identified by voltage regulator 184 based on terminal voltage feedback signal 160, voltage regulator 184 generates reactive current command signal 168 and sends reactive current command signal 168 to converter interface controller 156. Reactive current command signal 168 instructs converter interface controller 156 to increase a reactive component of current injected onto utility grid 136 upon occurrence of a grid contingency event. Further, in the exemplary embodiment, reactive current command signal 168 instructs converter interface controller 156 to increase a reactive component of current injected onto utility grid 136 proportional to an output of conversion assembly 34 during recovery from occurrence of a grid contingency event to maintain a substantially constant terminal voltage 138.

In the exemplary embodiment, voltage regulator 184 receives supplementary voltage command signal 243 from reactive booster system 241, receives terminal voltage feedback signal 160, and receives a voltage command signal (VREF) 240 from other volt-ampere reactive (VAR) regulators 247 (shown in FIG. 6). Upon detection of a grid contingency event, power limiter system 152 transmits a real current limiter signal 166 to converter interface controller 156 to reduce the output power of power conversion assembly 34. After the grid contingency event is completed, power limiter system 152 generates signals, for example real current command signal 166, that command a gradual increase in the power output of power conversion assembly 34. During the grid contingency event, e.g., terminal voltage 138 indicates occurrence of a grid contingency event, voltage regulator 184 generates a reactive current command signal 168 that increases the reactive current output by power conversion assembly 34 to support terminal grid voltage 138 until the grid contingency event is resolved. At the resolution of the grid contingency event, reactive current command signal 168 returns to a lower level, causing reactive current output by power conversion assembly 34 to decrease to about its level prior to the grid contingency event. As the output power of power conversion assembly 34 increases during recovery from the grid contingency event, additional reactive current may be needed to maintain terminal voltage 138 and avoid voltage collapse of utility grid 136.

Figure 8:
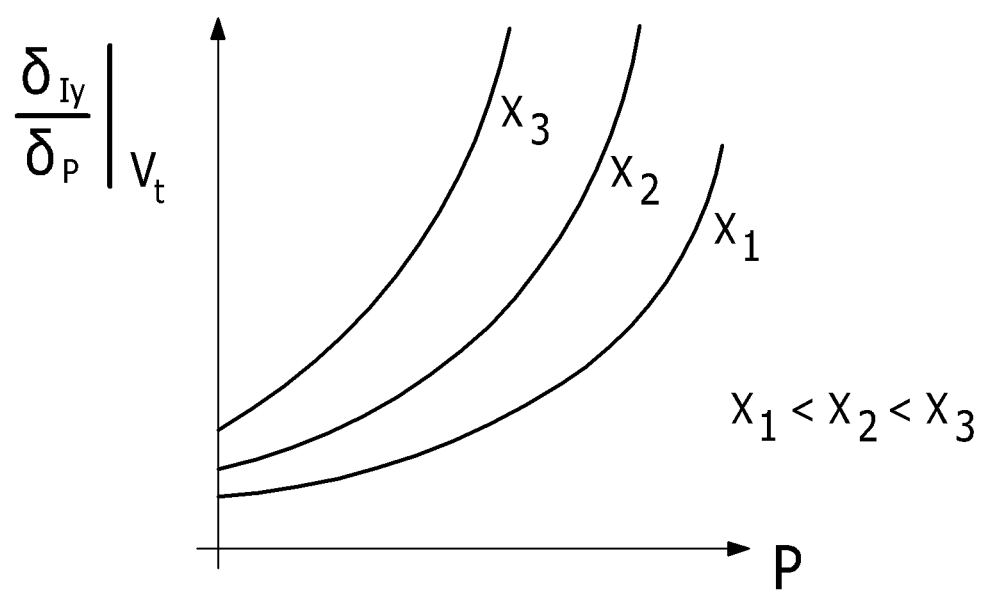
FIG. 8 is a graphical view of the derivative of reactive current with respect to power needed by the grid to maintain near constant voltage during a power increase in the system shown in FIG. 5 as a function of real power output of the system for three different grid impedances.

To facilitate maintaining a substantially constant terminal voltage 138 after terminal voltage feedback signal 160 indicates that the grid contingency event has ended (e.g., the terminal voltage 138 increases), reactive booster 241 generates supplementary voltage command signal 243 and transmits supplementary voltage command signal 243 to the voltage regulator 184. Supplementary voltage command signal 243 is added to voltage command signal 240. Hence, voltage regulator 184 generates a reactive current command signal 168 that increases reactive current output by power conversion assembly 34 as the power output of power conversion assembly 34 increases. In the exemplary embodiment, voltage regulator 184 causes an increase in reactive current output as a function of the rate of change of the output power of power conversion assembly 34. In other embodiments, the reactive current output of power conversion assembly 34 may be increased as a function of a magnitude of power, a magnitude of real current output, a rate of change of real current output, torque, a real current command, a power command, or any other suitable output parameter. In the exemplary embodiment, a rate of change (e.g., the derivative with respect to time) 245 of the output power of power conversion assembly 34 is estimated by a derivative estimator 242. In the example embodiment, non-linear gain (Kp) 244 is applied to rate of change 245 output by derivative estimator 242. Non-linear gain 244 is a function of the active power output level of power conversion assembly 34. The output of non-linear gain 244 (i.e. supplementary voltage command signal 243) is limited to positive values. Voltage regulator 184 sums supplementary voltage command signal 243 and voltage command signal 240 and subtracts terminal voltage feedback signal 160 to produce an error signal. A control block 246 receives the error signal and generates reactive current command signal 168. To facilitate avoiding voltage collapse of the utility grid 136 and to maintain a substantially constant terminal voltage 138 as the power output of power conversion assembly 34 is increased, nonlinear gain 244 is selected to satisfy the following inequality:

$$Kp_{(P)} \cdot Kvi \geq \frac{\partial Iy}{\partial P}\bigg|_{Vt=Const} \quad (1)$$

where Iy is the reactive current output of power conversion assembly 34, P is the active power output of power conversion assembly 34, and Vt is terminal voltage 138. The derivative term $$\frac{\partial Iy}{\partial P}\bigg|_{Vt=Const}$$

is a characteristic of utility grid 136 that may vary depending on, for example, the condition of utility grid 136, the construction of a particular utility grid, etc. As shown in FIG. 8, $$\frac{\partial Iy}{\partial P}\bigg|_{Vt=Const}$$

is nonlinear. For a particular grid, such as utility grid 136, the derivative term varies with the impedance of utility grid 136. In FIG. 8, X1, X2, and X3 are three different impedances of utility grid 136 as seen by, for example, power conversion assembly 34. The derivation of equation 1 is further described below.

Figure 9:
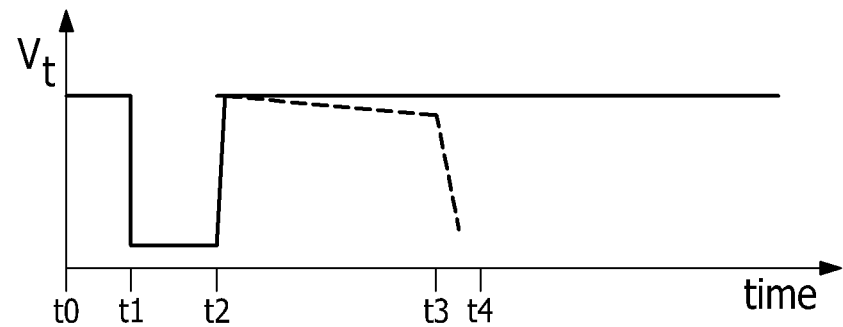
FIGS. 9-12 show graphical views of operating characteristics of the system shown in FIG. 5 before, during, and after occurrence of a grid contingency event.
Figure 10:
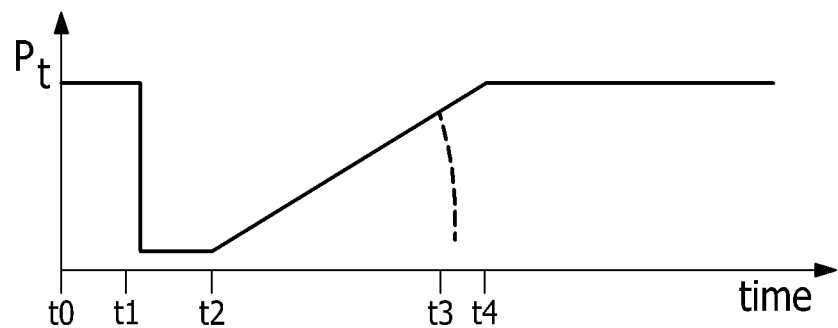
Figure 11:
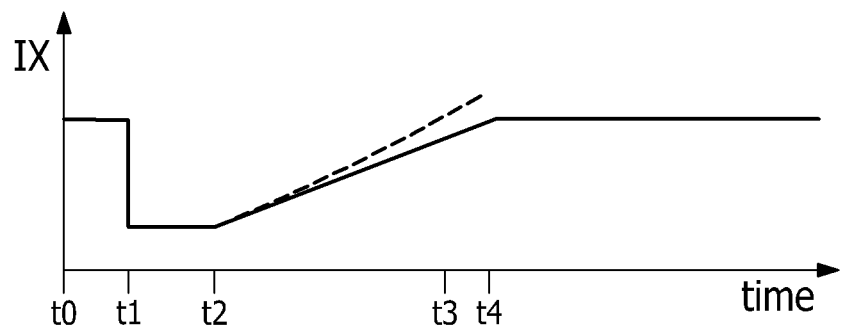
Figure 12:
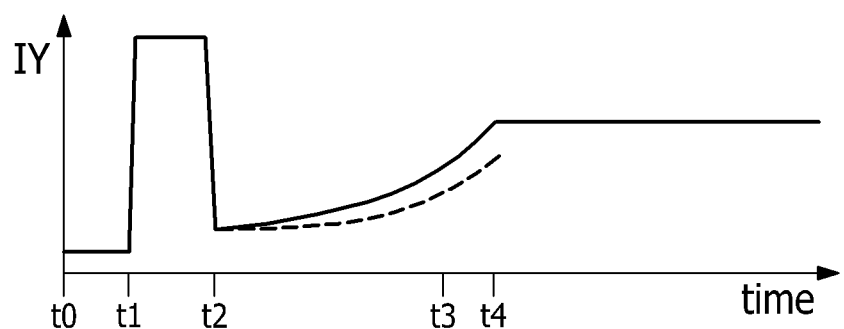

FIGS. 9-12 are graphical views illustrating, in solid lines, operation of power generation and delivery system 150 before during and after a grid contingency event. More specifically, FIG. 9 is a graphical view of terminal voltage 138 versus time and FIG. 10 is a graphical view of power output signal 161 versus time. FIG. 11 is a graphical view of real current (IX) output versus time, while FIG. 12 is a graphical view of reactive current (IY) output versus time. FIGS. 9-12 also illustrate, in dashed lines, operation of power generation and delivery system 150 without reactive booster 241.

With reference to FIGS. 9-12, at time t0, power generation and delivery system 150 is operating normally and at steady state. At time t1, a grid contingency event occurs. Terminal voltage 138 drops rapidly. As described above, power limiter system 152 generates signal to decrease power output of power conversion assembly 34 in response to the grid contingency event and real current (FIG. 11) decreases accordingly. Reactive current output (FIG. 12), however, is increased to support terminal voltage 138. Following resolution of the grid contingency event at time t2, terminal voltage 138 returns to substantially its initial, i.e. pre-contingency event, level and power limiter system 152 causes a gradual increase in the output power of power conversion assembly 34. The real current output of power generation and delivery system 150 also gradually increases beginning at time t2. Also at time t2, voltage regulator 184 generates a reactive current command signal 168 to increase reactive current output as a function of the rate of change of power signal 161. As a result, terminal voltage 138 remains substantially constant as the power output of power generation and delivery system 150 is increased to its level prior to the grid contingency event at about time t4.

Also shown, represented in dashed lines, in FIGS. 9-12 are the approximate terminal voltage 138, power output signal 161, real current output (IX), and reactive current output (IY) of power generation and delivery system 150 if reactive booster system 241 were not included. If reactive booster 241 did not generate a supplementary voltage command signal 243 to increase reactive current output as a function of the rate of change of power signal 161, the reactive output current would not increase as rapidly. As seen in FIGS. 11 and 12, the real and reactive current outputs diverge from those of power generation and delivery system 150 including reactive booster system 241 from the resolution of the grid contingency event at about time t2. As a result, terminal voltage 138 begins to decreases just after time t2, and terminal voltage 138 and power output begin to collapse at about time t3.

Mathematical support of this result for power generation and delivery system 150 including reactive booster system 241 and voltage regulator 184 may be shown beginning with an approximation for a change in terminal voltage 138. A change in terminal voltage 138 may be approximated by:

$$\Delta Vt \cong \Delta P \frac{\partial Vt}{\partial P}\bigg|_{Iy=const} + \Delta Iy \frac{\partial Vt}{\partial Iy}\bigg|_{P=const} \quad (2)$$

where Iy is the reactive current output of power conversion assembly 34, P is the active power output of power conversion assembly 34, and Vt is terminal voltage 138. If power output of power conversion assembly 34 increases at a constant rate ($r_p$), then:

$$\Delta P = \frac{r_p}{s} \quad (3)$$

where s is the Laplace operator. With reference to voltage regulator 184 (shown in FIG. 8) and equation 3:

$$\Delta Vt \cong \frac{r_p}{Kvi \frac{\partial Vt}{\partial Iy}} \cdot \frac{\left(\frac{\partial Vt}{\partial P} + \frac{\partial Vt}{\partial Iy} KpKvi\right)}{\left(\frac{s}{Kvi \frac{\partial Vt}{\partial Iy}} + 1\right)} \quad (4)$$

Based on equation 4, in order to obtain a ΔVt of about zero, assuming Kp is a function of the active power P and active power is changing at a nonzero rate $r_p$, then:

$$\frac{\partial Vt}{\partial P} + \frac{\partial Vt}{\partial Iy} Kp_{(P)} Kvi \approx 0 \quad (5)$$

As a result, the following inequality can be defined:

$$Kp_{(P)} Kvi \geq -\frac{\frac{\partial Vt}{\partial P}\bigg|_{Iy=const}}{\frac{\partial Vt}{\partial Iy}\bigg|_{P=const}} \quad (6)$$

Inequality 6 may be then be reduced to inequality 1 given above.

The above-described embodiments facilitate efficient and cost-effective operation of a wind turbine. The wind turbine includes a reactive booster system that monitors an output parameter of the wind turbine and determines a supplemental voltage command based at least partially on the rate of change of the monitored output parameter. The wind turbine also includes a voltage regulator that determines a reactive current command based at least partially on the supplementary voltage command. Providing additional reactive current output as a function of the rate of change in the monitored parameter facilitates maintaining a substantially constant terminal voltage following a grid contingency event. The method and systems described herein facilitate prevention of voltage collapse and improve the voltage stability of a deteriorated utility grid following a grid contingency event.

Exemplary embodiments of a wind turbine, power limiter system, and methods for operating a wind turbine in response to an occurrence of a grid contingency event are described above in detail. The methods, wind turbine, and reactive booster system are not limited to the specific embodiments described herein, but rather, components of the wind turbine, components of the reactive booster system, and/or steps of the methods may be utilized independently and separately from other components and/or steps described herein. For example, the reactive booster system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a power generation and delivery system while increasing a power output of the power generation and delivery system, the power generation and delivery system including an electrical generator coupled to a utility grid, a power converter, and a controller, said method comprising:
    facilitating recovery from a utility grid contingency event comprising:
        transmitting a voltage command signal to a voltage regulator;
        increasing active power output from the power generation and delivery system into the utility grid;
        monitoring a signal indicative of the active power output of the power generation and delivery system; and,
        increasing reactive current injection from the power generation and delivery system into the utility grid simultaneously with increasing active power output into the utility grid comprising:
            determining a rate of change of the active power output as a function of time comprising determining a time-derivative of the active power output;
            generating a supplementary voltage command signal proportional to the rate of change of the active power output;

transmitting the supplementary voltage command signal to the voltage regulator;
summing the voltage command signal with the supplementary voltage command signal through the voltage regulator;
generating a reactive current command signal based on the sum of the voltage command signal and the supplementary voltage command signal; and,
controlling operation of the power converter based on the reactive current command signal to facilitate maintaining a constant terminal voltage as the active power output of the power generation and delivery system is increased.

2. A method in accordance with claim 1, wherein controlling operation of the power converter based on the reactive current command signal comprises increasing reactive current output by the power converter proportional to the determined rate of change of the signal indicative of the active power output of the power generation and delivery system.

3. A method in accordance with claim 1, wherein generating a reactive current command signal comprises increasing a reference voltage at the voltage regulator by an amount proportional to the rate of change of the signal indicative of the active power output of the power generation and delivery system.

4. A method in accordance with claim 3, further comprising transmitting a terminal voltage feedback signal to the voltage regulator, and wherein generating a reactive current command signal comprises generating an error signal as a function of the terminal voltage feedback signal and the reference voltage.

5. A method in accordance with claim 1, wherein the electrical generator comprises a wind turbine.

6. A control system comprising:
a reactive booster, said reactive booster comprising a derivative estimator, said reactive booster configured to:
receive an output power signal from a power conversion assembly, the output power signal representative of output power transmitted to a utility grid coupled to the power conversion assembly through a terminal therebetween;
generate a power time-derivative signal representative of a rate of change of the output power signal through said derivative estimator; and,
generate a supplementary voltage command signal through said derivative estimator proportional to the rate of change of the output power signal during recovery from a utility grid contingency event; and,
a voltage regulator coupled to said reactive booster, said voltage regulator configured to:
receive a voltage command signal;
receive the supplementary voltage command signal;
generate a reactive current command signal based on a summation of the voltage command signal and the supplementary voltage command signal;
transmit the reactive current command signal to a controller; and,
increase reactive current injection from the power conversion assembly into the utility grid simultaneously with an increase of output power transmitted to the utility grid to facilitate maintaining a constant terminal voltage as the output power of the power conversion assembly is increased.

7. A system in accordance with claim 6 wherein said voltage regulator is further configured to receive a terminal voltage feedback signal and to generate the reactive current command signal based at least partially on the terminal voltage feedback signal.

8. A power generation and distribution system comprising:
an electric generator;
a power conversion assembly coupled to said electric generator, said power conversion assembly further coupled to a utility grid through a terminal therebetween, said power conversion assembly configured to receive power generated by said electric generator and convert the power received to active power suitable for transmission over the utility grid and reactive current suitable for injection into the utility grid; and,
a control system communicatively coupled to said power conversion assembly, said control system comprising:
a reactive booster comprising a derivative estimator; and,
a voltage regulator coupled to said reactive booster, said control system configured to:
transmit a voltage command signal to said voltage regulator;
generate an active power signal representative of the active power;
generate a power time-derivative signal representative of a rate of change of the active power signal through said derivative estimator;
generate a supplementary voltage command signal through said derivative estimator proportional to the rate of change of the active power signal during recovery from a utility grid contingency event;
generate a reactive current command signal based on a summation of the voltage command signal and the supplementary voltage command signal;
provide the reactive current control signal to said power conversion assembly during the recovery from the utility grid contingency event; and,
increase reactive current injection from said power conversion assembly into the utility grid simultaneously with an increase of active power transmitted to the utility grid to facilitate maintaining constant terminal voltage as the active power of said power conversion assembly is increased.

9. A system in accordance with claim 8, wherein said control system further comprises a power limiter configured to generate a power limiting signal to limit the active power of said power conversion assembly upon occurrence of the grid contingency event.

10. A system in accordance with claim 9, wherein said power conversion assembly is further configured to increase reactive current output by said power conversion assembly upon receipt of the reactive current control signal corresponding to a positive rate of change of the active power signal.

11. A method in accordance with claim 1, further comprising:
determining when a utility grid contingency event occurs; and,
determining when the utility grid contingency event concludes.

12. A method in accordance with claim 11, further comprising limiting the active power output upon determination of the utility grid contingency event.

* * * * *